(12) United States Patent
Olesen et al.

(10) Patent No.: US 7,164,740 B2
(45) Date of Patent: Jan. 16, 2007

(54) WIRELESS COMMUNICATION APPARATUS USING FAST FOURIER TRANSFORMS TO CREATE, OPTIMIZE AND INCORPORATE A BEAM SPACE ANTENNA ARRAY IN AN ORTHOGONAL FREQUENCY DIVISION MULTIPLEXING RECEIVER

(75) Inventors: Robert Lind Olesen, Huntington, NY (US); Alexander Reznik, Titusville, NJ (US); Philip J. Pietraski, Huntington Station, NY (US); Rui Yang, Greenlawn, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

(21) Appl. No.: 10/991,557

(22) Filed: Nov. 18, 2004

(65) Prior Publication Data

US 2005/0129154 A1 Jun. 16, 2005

Related U.S. Application Data

(60) Provisional application No. 60/523,939, filed on Nov. 21, 2003.

(51) Int. Cl.
*H04B 7/10* (2006.01)
(52) U.S. Cl. ............... 375/347; 375/226; 375/267; 375/347; 375/371; 370/203
(58) Field of Classification Search .......... 375/219, 375/226, 259, 267, 269, 347, 362, 371, 373; 370/203, 206, 347, 480, 503; 455/562.1, 455/62.4, 561
See application file for complete search history.

(56) References Cited

U.S. PATENT DOCUMENTS

| | | | |
|---|---|---|---|
| 3,803,618 A | 4/1974 | Coleman | |
| 5,218,359 A | 6/1993 | Minamisono | |
| 6,438,389 B1 | 8/2002 | Sandhu et al. | |
| 6,470,055 B1 * | 10/2002 | Feher | 375/259 |
| 6,549,762 B1 | 4/2003 | Hirabe | |
| 6,611,231 B1 | 8/2003 | Crilly et al. | |
| 6,771,988 B1 * | 8/2004 | Matsuoka et al. | 455/562.1 |
| 6,992,622 B1 | 1/2006 | Chiang et al. | |
| 2002/0039347 A1 * | 4/2002 | Matsugatani et al. | 370/203 |
| 2002/0102950 A1 | 8/2002 | Gore et al. | |
| 2003/0156570 A1 * | 8/2003 | Alamouti et al. | 370/347 |

(Continued)

OTHER PUBLICATIONS

Nester, "The Fast Fourier Transform and the Butler Matrix", IEEE Transactions on Antennas and Propagation, May 1968, p. 360.

(Continued)

*Primary Examiner*—Mohammed Ghayour
*Assistant Examiner*—Edith Chang
(74) *Attorney, Agent, or Firm*—Volpe and Koenig, P.C.

(57) ABSTRACT

A wireless communication apparatus which uses fast Fourier transforms (FFTs) in an orthogonal frequency division multiplexing (OFDM) receiver which incorporates a beam space antenna array. The beam space antenna array may be implemented with a Butler matrix array. The beam space antenna array may be a circular array, vertical array, or a combination of both circular and vertical arrays, for providing the desired angular antenna coverage. In one embodiment, the antenna array is optimized because the FFTs are linear invariant transform operators, whereby the order of operations in the OFDM receiver can be interchanged.

52 Claims, 2 Drawing Sheets

U.S. PATENT DOCUMENTS

| | | |
|---|---|---|
| 2003/0185326 A1* | 10/2003 | Kolze ........................ 375/371 |
| 2003/0228857 A1 | 12/2003 | Maeki |
| 2003/0235149 A1* | 12/2003 | Chan et al. ................ 370/206 |
| 2004/0001554 A1 | 1/2004 | Sun et al. |
| 2004/0108961 A1 | 6/2004 | Hay et al. |
| 2004/0198452 A1 | 10/2004 | Roy |

OTHER PUBLICATIONS

Brown, "The Uniqueness of the Butler Matrix as a Commutating Switch", IEEE Transactions on Antennas and Propagation, Sep. 1971, pp. 694-695.

Fujii, "Pseudo-Orthogonal Multibeam-Time Transmit Diversity for OFDM-CDMA", IEEE, 2002, pp. 222-226.

* cited by examiner

WIRELESS COMMUNICATION APPARATUS USING FAST FOURIER TRANSFORMS TO CREATE, OPTIMIZE AND INCORPORATE A BEAM SPACE ANTENNA ARRAY IN AN ORTHOGONAL FREQUENCY DIVISION MULTIPLEXING RECEIVER

CROSS REFERENCE TO RELATED APPLICATION

This application claims priority from U.S. Provisional Application No. 60/523,939, filed Nov. 21, 2003, which is incorporated by reference as if fully set forth herein.

FIELD OF INVENTION

The present invention relates to a wireless communication system. More particularly, the present invention relates to wireless communication apparatus using Fast Fourier Transforms (FFTs) to create, optimize and incorporate a beam space antenna array in an Orthogonal Frequency Division Multiplexing (OFDM) receiver.

BACKGROUND

Improving the capacity of a wireless communication system is perhaps one of the most important areas in cellular technology that requires further exploration. Deficiencies in the spectral efficiency and power consumption of mobile systems have motivated wireless communication system designers to explore new areas in the technology that will offer capacity relief. One of these new areas is the use of antenna arrays in wireless systems to improve system capacity.

Antenna arrays deal with using multiple antenna elements at a receiver and/or transmitter to improve the capacity of the system. For example, using multiple antennas in a wireless receiver offers diversity of received signals. This proves to work well in fading environments and multi-path environments, where one path of a signal received by one antenna of the receiver may be subjected to difficult obstacles. In this scenario, the other antennas of the receiver receive different paths of the signal, thus increasing the probability that a better component of the signal, (i.e., a less corrupt version of the signal), may be received.

One of the challenges facing the use of antenna arrays is that they usually require a high degree of computational complexity. This is because the system will attempt to process each signal at each antenna by a separate digital baseband processing element which may lead to excessive power consumption, hardware resources, and processing time.

OFDM is a technology that is being considered by different industry drivers for use in many different communications applications, including antenna arrays. It is desired to find ways to reduce the complexity of antenna array receiver systems using OFDM technology.

SUMMARY

The present invention is related to wireless communication apparatus which uses FFTs in an OFDM receiver which incorporates a beam space antenna array. The beam space antenna array may be implemented with a Butler matrix array. The beam space antenna array may be a circular array, vertical array, or a combination of both circular and vertical arrays, for providing the desired angular antenna coverage.

The present invention implements an OFDM receiver and beam space antenna array by re-using FFTs in an efficient manner. The antenna array is optimized because the FFTs are linear invariant transform operators, whereby the order of operations in the present invention can be interchanged.

BRIEF DESCRIPTION OF THE DRAWINGS

A more detailed understanding of the invention may be had from the following description of a preferred embodiment, given by way of example and to be understood in conjunction with the accompanying drawing wherein.

DETAILED DESCRIPTION OF THE PREFERRED EMBODIMENT(S)

The present invention provides wireless communication apparatus which implements an OFDM receiver including a beam space antenna array, such as a Butler matrix array. A Butler matrix array is equivalent to an FFT processor implemented at the baseband.

The apparatus may include an OFDM receiver, a wireless transmit/receive unit (WTRU), a base station or an integrated circuit (IC).

Hereafter, the terminology "WTRU" includes but is not limited to a user equipment (UE), a mobile station, a fixed or mobile subscriber unit, a pager, or any other type of device capable of operating in a wireless environment.

When referred to hereafter, the terminology "base station" includes but is not limited to a Node-B, a site controller, an access point or any other type of interfacing device in a wireless environment.

The features of the present invention may be incorporated into an IC or be configured in a circuit comprising a multitude of interconnecting components.

In its simplest form, the number of beams that may be generated is equal to the number of antenna elements in the antenna array. The antenna array may provide any desired angular coverage. The angular coverage of the antenna array may include a circular array, which provides 360 degrees of simultaneous coverage.

In accordance with a preferred embodiment of the present invention, the OFDM receiver uses an FFT in its implementation for demodulation of a number of carriers. Each carrier is then independently modulated by a desired modulation scheme, such as Quadrature Phase Shift Keying (QPSK), Quadrature Amplitude Modulation (QAM), or the like. The signals received by the OFDM receiver are processed using the antenna array.

Figure 1:
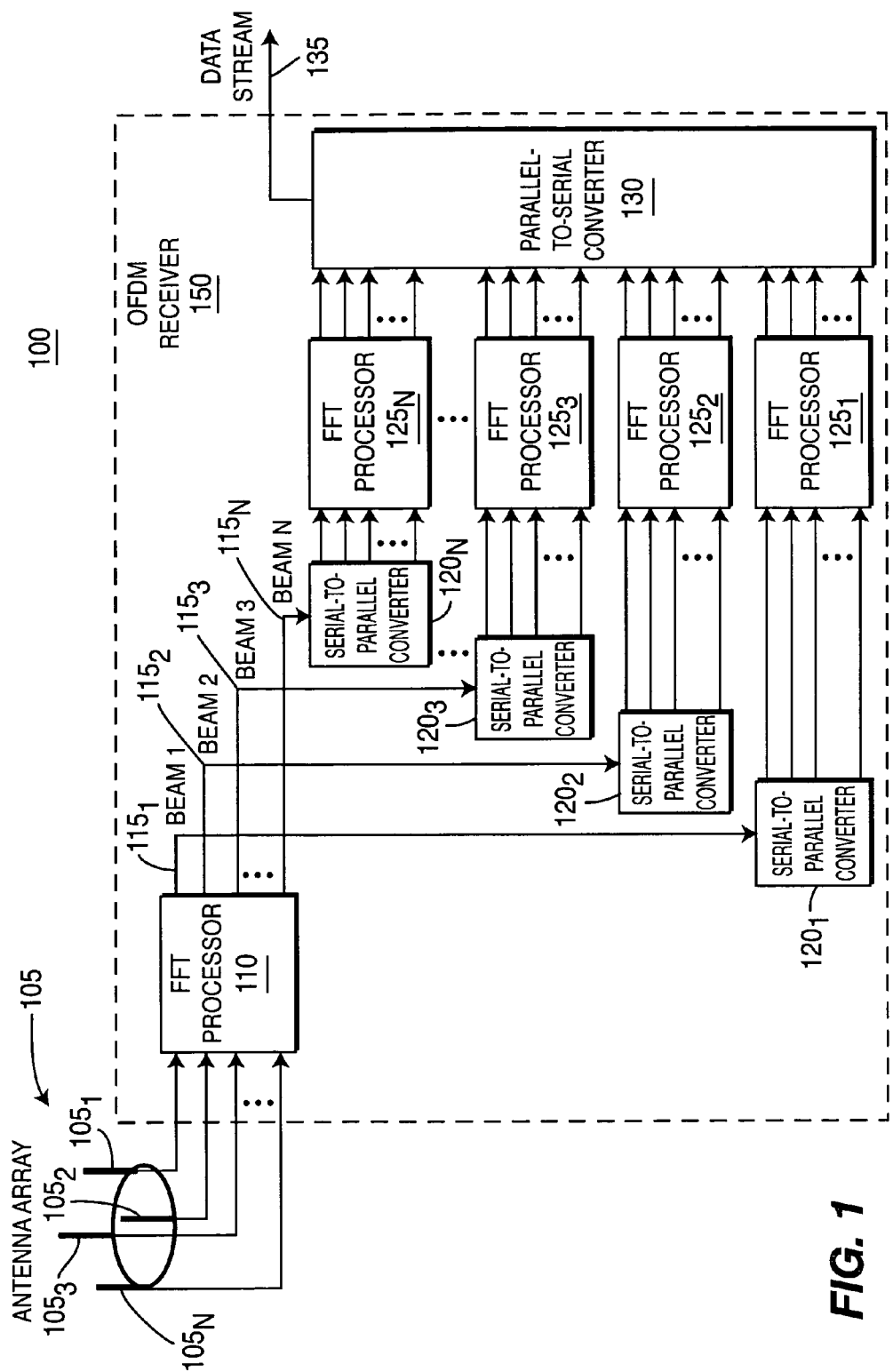
FIG. 1 shows a multiple beam OFDM receiver architecture in accordance with a preferred embodiment of the present invention.

FIG. 1 shows one embodiment of a multiple beam OFDM architecture 100 used to implement FFT re-use in an OFDM receiver and antenna array. As shown in FIG. 1, the OFDM architecture 100 includes an antenna array 105 including a plurality of antenna elements $105_1, 105_2, 105_3, \ldots, 105_N$, the outputs of which are fed to an OFDM receiver 150. It should be understood that the number of elements used by the antenna array 105 may vary.

The OFDM receiver 150 includes a first stage FFT processor 110, a plurality of serial-to-parallel (S/P) converters $120_1, 120_2, 120_3, \ldots, 120_N$, N second stage FFT processors, $125_1$, $125_2$, $125_3$, ..., $125_N$, and, optionally, a parallel-to-serial (P/S) converter 130 which outputs a single serial data stream 135.

The first stage FFT processor 110 receives a plurality of beam signals from the antenna elements $105_1$, $105_2$, $105_3$, ..., $105_N$, respectively. The first stage FFT processor 110 performs antenna processing on the beam signals so as to separate spatial beams 1 through N which can be processed independently.

In one embodiment, the antenna array 105 is a circular array which provides full azmuthal coverage. In another embodiment, the antenna array 105 is a vertical array which provides only elevational coverage. In yet another embodiment, a combination of both a circular and vertical antenna array may be used, provided there are at least two, or preferably four or more, antenna elements in each azmuthal or elevation plane. The signals from the antenna array 105 are processed by the first stage FFT processor 110, which may be a Butler matrix.

The first stage FFT processor 110 performs a beam space operation on the antenna signal vector, as described by Equation (1):

$$Y = w^H V^H X \qquad \text{Equation (1)}$$

where Y is the concatenated signal vectors received from antenna elements $105_1$, $105_2$, $105_3$, ..., $105_N$, for N antenna elements, $w^H$ is the Hermitian of a weight vector which performs an optional windowing function, which may be used to reduce sidelobes of regions outside of the beam space angular region. $V^H$ is the Hermitian of the Butler (FFT) matrix which transforms the antenna signal vector X from element space to Y in beam space. The Butler matrix transforms the signal from element, or Cartesian space to beam space, or angular space. By transforming to beam space, it is possible to operate on signals which arrive within an angular spatial region directly, rather than indirectly in the element space by using some arbitrary cost function. In other words, the channel as perceived by the receiver is transformed to exhibit an angular dependency, rather than a Cartesian dependency, which is the same dependency that the received signals have.

The Butler (FFT) matrix is defined by Equation (2) as follows:

$$v_m^H = \frac{1}{N} \frac{\sin\left(\frac{N}{2}(\vartheta - m2\pi/N)\right)}{\sin\left(\frac{1}{2}(\vartheta - m2\pi/N)\right)} \qquad \text{Equation (2)}$$

where θ is the m'th beam's pointing angle and N is assumed to be even.

Figure 2:
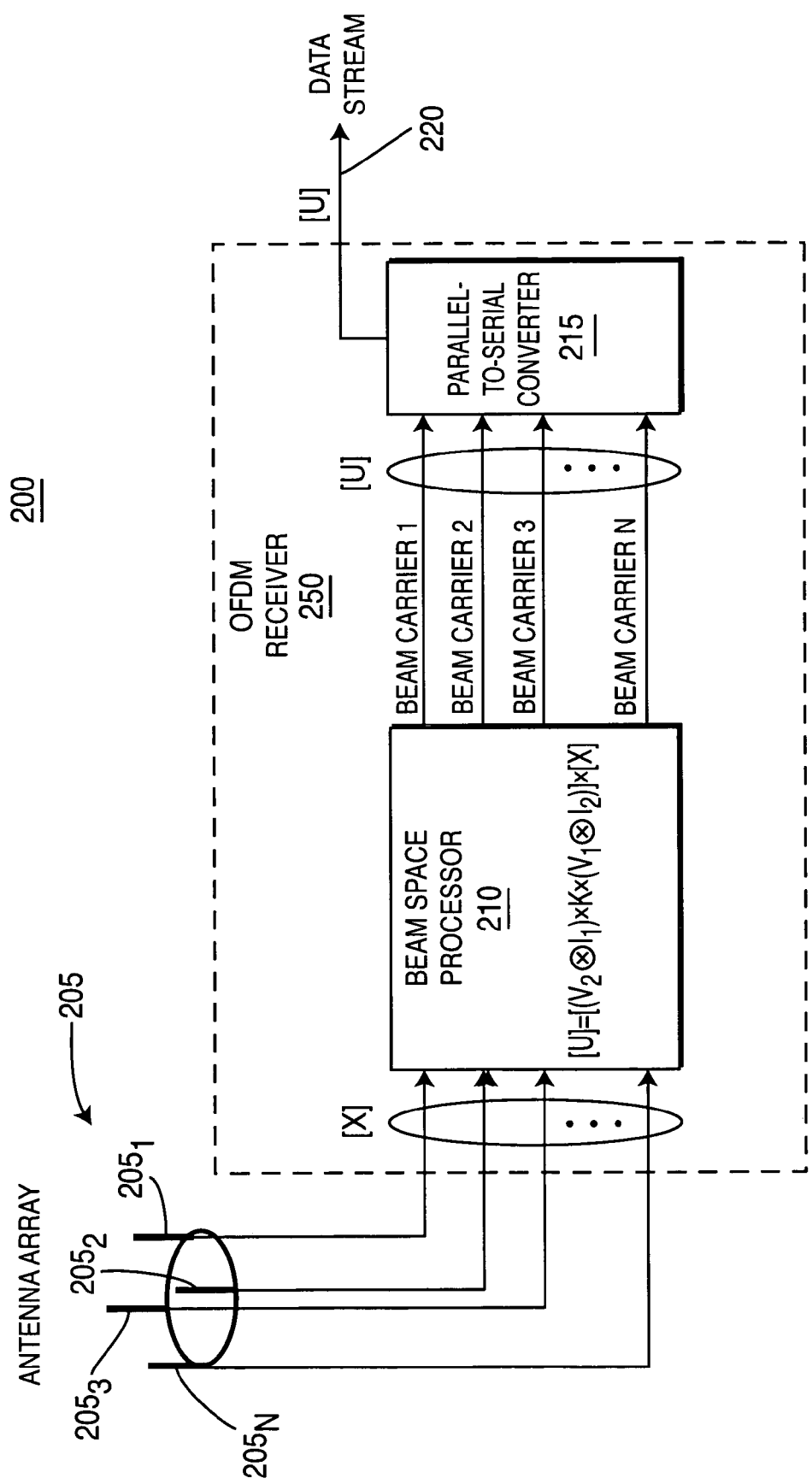
FIG. 2 shows a simplified architecture of the OFDM receiver architecture of FIG. 1.

The FFT processors 110, $125_1$, $125_2$, $125_3$, ..., $125_N$, shown in FIG. 1, may be consolidated into a single beam space processor 210, as shown in FIG. 2, using a simpler linear operation as described by the following Equation (3):

$$[U] = [(V_2 \otimes I_1) \times K \times (V_1 \otimes I_2)] \times [X] \qquad \text{Equation (3)}$$

where $V_2$ is an M×M Fourier matrix for M sub-carriers, ⊗ is a Kronecker product, and $I_1$ is an N×N identity matrix. K is a bit reordering matrix which is determined by the size of $V_2$, $V_1$ is an N×N Fourier matrix for N antenna elements and $I_2$ is an M×M identity matrix.

The capacity C of an OFDM system without a beam space operation is determined by Equation (4):

$$C = \log_2 \det\left(I_N + \frac{E_s}{M_T N_o} HH^H\right) \qquad \text{Equation (4)}$$

where I is the identity matrix of size N×N, $E_s/M_T$ is the energy per symbol per antenna, $N_o$ is the noise power spectral density, and H is the channel matrix of dimension $M_R$ by $M_T$ for R receive antenna and T transmit antennas. In accordance with the present invention, Equation (5) determines the capacity C of an OFDM system which performs a beam space operation, (i.e., OFDM architecture 100), as follows:

$$C = \log_2 \det\left(I_N + \frac{E_s}{M_T N_o} HH^H V^H\right). \qquad \text{Equation (5)}$$

Since V is an ortho-normal matrix, Equation (5) may be rewritten as:

$$C = \log_2 \det\left(I_N + \frac{E_s}{M_T N_o} \lambda\right) \qquad \text{Equation (6)}$$

where λ is the eigen-decomposition of the modified channel matrix $HH^H V^H$. As a result, the rank of the modified channel may be optimized by weighting beams appropriately. Either of the outputs of the first stage FFT processor 110 shown in FIG. 1 and the beam space processor 210 shown in FIG. 2 may be weighted using maximum ratio combining by estimating the signal-to-noise ratio (SNR) of each beam output.

The first stage FFT processor 110 outputs beams $115_1$, $115_2$, $115_3$, ..., $115_N$, to the S/P converters $120_1$, $120_2$, $120_3$, ..., $120_N$, respectively, which output respective signals, (i.e., M sub-carriers), to the second stage FFT processors $125_1$, $125_2$, $125_3$, ..., $125_N$, which convert each the signals associated with the beams $115_1$, $115_2$, $115_3$, ..., $115_N$, into the frequency domain for further signal processing, (e.g., minimum mean square error (MMSE) equalization, zero-forcing (ZF) equalization, matched filtering, or the like). The outputs of the second stage FFT processors $125_1$, $125_2$, $125_3$, ..., $125_N$ are optionally fed to the P/S converter 130 which serializes the parallel FFT outputs to form a single output data stream 135.

FIG. 2 shows a simplified multiple beam OFDM architecture 200 used to optimize and implement FFT re-use in an OFDM receiver 250 and an antenna array 205, in accordance with another embodiment of the present invention. Similar to the OFDM architecture shown in FIG. 1, the OFDM architecture 200 shown in FIG. 2 includes an antenna array 205 including N antenna elements $205_1$, $205_2$, $205_3$, ..., $205_N$, the outputs of which are fed to an OFDM receiver 250.

The OFDM receiver 250 includes a beam space processor 210, which performs a bit reordering operation, and an optional P/S converter 215 which receives N parallel beam carrier signals from the beam space processor 210 derived from signals received from the N antenna elements $205_1$, $205_2$, $205_3$, ..., $205_N$, and serializes the signals to form a single output data stream 220. The bit reordering operation changes the order of operations such that only one beam space processor 210 is required. The beam space processor 210 uses an interleaving operation to reduce the complexity of the beam space OFDM receiver. The beam space processor uses an FFT to implement a Butler matrix. The OFDM architecture 200 shown in FIG. 2 essentially performs the same functions as the OFDM architecture 100 shown in FIG. 1, but in a more efficient and less complex manner.

While this invention has been particularly shown and described with reference to preferred embodiments, it will be understood by those skilled in the art that various changes in form and details may be made therein without departing from the scope of the invention described hereinabove.

What is claimed is:

1. A wireless communication apparatus comprising:
   (a) an antenna array; and
   (b) an orthogonal frequency division multiplexing (OFDM) receiver in communication with the antenna array, the OFDM receiver being configured to perform fast Fourier transforms (FFTs) on signals received by the antenna array so as to separate spatial beams derived from the received signals and process each beam independently, wherein the antenna array comprises N antenna elements and the number of spatial beams is also N, and beam signals "[X]" are transformed to a parallel data stream "[U]" by performing a fast Fourier transform (FFT) beam space operation on the beam signals "[X]" in accordance with the following equation: $[U]=[(V_2 \otimes I_1) \times K \times (V_1 \otimes I_2)] \times [X]$, where $V_2$ is an M×M Fourier matrix for M sub-carriers, $\otimes$ is a Kronecker product, $I_1$ is an N×N identity matrix, K is a bit reordering matrix which is determined by the size of $V_2$, $V_1$ is an N×N Fourier matrix for the N antenna elements and $I_2$ is an M×M identity matrix.

2. The apparatus of claim 1 wherein the OFDM receiver comprises:
   (b1) a first stage FFT processor in communication with the antenna array, the first stage FFT processor being configured to perform at least one FFT function on the received signals and output the separate spatial beams;
   (b2) N serial-to-parallel (S/P) converters, each S/P converter being configured to receive a respective one of the separate spatial beams; and
   (b3) N second stage FFT processors in communication with respective ones of the plurality of S/P converters.

3. The apparatus of claim 2, wherein the OFDM receiver further comprises:
   (b4) a parallel-to-serial (P/S) converter in communication with each of the second stage FFT processors, wherein the P/S converter is configured to output a data stream based on beam signals processed by each of the second stage FFT processors.

4. The apparatus of claim 2 wherein the first stage FFT processor is a Butler matrix.

5. The apparatus of claim 1 wherein the antenna array is a circular antenna array which provides 360 degrees of simultaneous azmuthal coverage.

6. The apparatus of claim 1 wherein the antenna array is a vertical antenna array which provides elevational coverage.

7. The apparatus of claim 1 wherein the antenna array is a combination of (i) a circular antenna array which provides 360 degrees of simultaneous azmuthal coverage, and (ii) a vertical antenna array which provides elevational coverage.

8. A wireless communication apparatus comprising:
   (a) an antenna array having N antenna elements; and
   (b) a beam space processor in communication with the antenna array, the beam space processor being configured to perform fast Fourier transforms (FFTs) on signals received by the antenna array so as to output N parallel beam carrier signals derived from the received signals, wherein beam signals "[X]" are transformed to a parallel data stream "[U]" by performing a fast Fourier transform (FFT) beam space operation on the beam signals "[X]" in accordance with the following equation: $[U]=[(V_2 \otimes I_1) \times K \times (V_1 \otimes I_2)] \times [X]$, where $V_2$ is an M×M Fourier matrix for M sub-carriers, $\otimes$ is a Kronecker product, $I_1$ is an N×N identity matrix, K is a bit reordering matrix which is determined by the size of $V_2$, $V_1$ is an N×N Fourier matrix for the N antenna elements and $I_2$ is an M×M identity matrix.

9. The apparatus of claim 8 wherein the beam space processor is configured to change an order of operations as necessary to perform at least one FFT function on the received signals and output the N parallel beam carrier signals, and the apparatus further comprises a parallel-to-serial (P/S) converter in communication with the beam space processor, wherein the P/S converter is configured to serialize the N parallel beam carrier signals to form a single output data stream.

10. The apparatus of claim 9 wherein the beam space processor uses an FFT to implement a Butler matrix in an efficient manner.

11. The apparatus of claim 8 wherein the antenna array is a circular antenna array which provides 360 degrees of simultaneous azmuthal coverage.

12. The apparatus of claim 8 wherein the antenna array is a vertical antenna array which provides elevational coverage.

13. The apparatus of claim 8 wherein the antenna array is a combination of (i) a circular antenna array which provides 360 degrees of simultaneous azmuthal coverage, and (ii) a vertical antenna array which provides elevational coverage.

14. An orthogonal frequency division multiplexing (OFDM) receiver used in combination with an antenna array, the antenna array comprising N antenna elements and the number of spatial beams is also N, the OFDM receiver comprising:
   (a) a first stage FFT processor for performing fast Fourier transforms (FFTs) on signals received by the antenna array so as to separate spatial beams derived from the received signals and process each beam independently;
   (b) a plurality of serial-to-parallel (S/P) converters, each S/P converter being configured to receive a respective one of the separate spatial beams; and
   (c) a plurality of second stage FFT processors in communication with respective ones of the plurality of S/P converters, wherein beam signals "[X]" are transformed to a parallel data stream "[U]" by performing a fast Fourier transform (FFT) beam space operation on the beam signals "[X]" in accordance with the following equation: $[U]=[(V_2 \otimes I_1) \times K \times (V_1 \otimes I_2)] \times [X]$, where $V_2$ is an M×M Fourier matrix for M sub-carriers, $\otimes$ is a Kronecker product, $I_1$ is an N×N identity matrix, K is a bit reordering matrix which is determined by the size of $V_2$, $V_1$ is an N×N Fourier matrix for the N antenna elements and $I_2$ is an M×M identity matrix.

15. The OFDM receiver of claim 14 further comprising:
   (d) a parallel-to-serial (P/S) converter in communication with each of the second stage FFT processors, wherein the P/S converter is configured to output a data stream based on beam signals processed by each of the second stage FFT processors.

16. The OFDM receiver of claim 14 wherein the first stage FFT processor is a Butler matrix.

17. The OFDM receiver of claim 14 wherein the antenna array is a circular antenna array which provides 360 degrees of simultaneous azmuthal coverage.

18. The OFDM receiver of claim 14 wherein the antenna array is a vertical antenna array which provides elevational coverage.

19. The OFDM receiver of claim 14 wherein the antenna array is a combination of (i) a circular antenna array which provides 360 degrees of simultaneous azmuthal coverage, and (ii) a vertical antenna array which provides elevational coverage.

20. An orthogonal frequency division multiplexing (OFDM) receiver used in combination with an antenna array having N antenna elements, the OFDM receiver comprising:
  (a) a beam space processor in communication with the antenna array, the beam space processor being configured to change an order of operations as necessary to perform fast Fourier transforms (FFTs) on signals received by the antenna array and output N beam carrier signals; and
  (b) a parallel-to-serial (P/S) converter in communication with the beam space processor, wherein the P/S converter is configured to serialize the N beam carrier signals to provide a data stream, wherein beam signals "[X]" are transformed to a parallel data stream "[U]" by performing a fast Fourier transform (FFT) beam space operation on the beam signals "[X]" in accordance with the following equation: $[U]=[(V_2 \otimes I_1) \times K \times (V_1 \otimes I_2)] \times [X]$, where $V_2$ is an M×M Fourier matrix for M sub-carriers, $\otimes$ is a Kronecker product, $I_1$ is an N×N identity matrix, K is a bit reordering matrix which is determined by the size of $V_2$, $V_1$ is an N×N Fourier matrix for the N antenna elements and $I_2$ is an M×M identity matrix.

21. The OFDM receiver of claim 20 wherein the beam space processor uses an FFT to implement a Butler matrix in an efficient manner.

22. The OFDM receiver of claim 20 wherein the antenna array is a circular antenna array which provides 360 degrees of simultaneous azmuthal coverage.

23. The OFDM receiver of claim 20 wherein the antenna array is a vertical antenna array which provides elevational coverage.

24. The OFDM receiver of claim 20 wherein the antenna array is a combination of (i) a circular antenna array which provides 360 degrees of simultaneous azmuthal coverage, and (ii) a vertical antenna array which provides elevational coverage.

25. An integrated circuit (IC) used to process signals received by an antenna array, the antenna array comprising N antenna elements and the number of spatial beams is also N, the IC comprising:
  (a) a first stage FFT processor for performing fast Fourier transforms (FFTs) on the signals received by the antenna array so as to separate spatial beams derived from the received signals and process each beam independently;
  (b) a plurality of serial-to-parallel (S/P) converters, each S/P converter being configured to receive a respective one of the separate spatial beams; and
  (c) a plurality of second stage FFT processors in communication with respective ones of the plurality of S/P converters, wherein beam signals "[X]" are transformed to a parallel data stream "[U]" by performing a fast Fourier transform (FFT) beam space operation on the beam signals "[X]" in accordance with the following equation: $[U]=[(V_2 \otimes I_1) \times K \times (V_1 \otimes I_2)] \times [X]$, where $V_2$ is an M×M Fourier matrix for M sub-carriers, $\otimes$ is a Kronecker product, $I_1$ is an N×N identity matrix, K is a bit reordering matrix which is determined by the size of $V_2$, $V_1$ is an N×N Fourier matrix for the N antenna elements and $I_2$ is an M×M identity matrix.

26. The IC of claim 25 further comprising:
  (d) a parallel-to-serial (P/S) converter in communication with each of the second stage FFT processors, wherein the P/S converter is configured to output a data stream based on beam signals processed by each of the second stage FFT processors.

27. An integrated circuit (IC) used to process signals received by an antenna array, the antenna array comprising N antenna elements and the number of spatial beams is also N, the IC comprising:
  (a) a beam space processor in communication with the antenna array, the beam space processor being configured to change an order of operations as necessary to perform fast Fourier transforms (FFTs) on signals received by the antenna array and output N beam carrier signals; and
  (b) a parallel-to-serial (P/S) converter in communication with the beam space processor, wherein the P/S converter is configured to serialize the N beam carrier signals to form a single output data stream, wherein beam signals "[X]" are transformed to a parallel data stream "[U]" by performing a fast Fourier transform (FFT) beam space operation on the beam signals "[X]" in accordance with the following equation: $[U]=[(V_2 \otimes I_1) \times K \times (V_1 \otimes I_2)] \times [X]$, where $V_2$ is an M×M Fourier matrix for M sub-carriers, $\otimes$ is a Kronecker product, $I_2$ is an N×N identity matrix, K is a bit reordering matrix which is determined by the size of $V_2$, $V_1$ is an N×N Fourier matrix for the N antenna elements and $I_2$ is an M×M identity matrix.

28. A wireless transceiver comprising:
  (a) an antenna array; and
  (b) an orthogonal frequency division multiplexing (OFDM) receiver in communication with the antenna array, the OFDM receiver being configured to perform fast Fourier transforms (FFTs) on signals received by the antenna array so as to separate spatial beams derived from the received signals and process each beam independently, wherein the antenna array comprises N antenna elements and the number of spatial beams is also N, and beam signals "[X]" are transformed to a parallel data stream "[U]" by performing a fast Fourier transform (FFT) beam space operation on the beam signals "[X]" in accordance with the following equation: $[U]=[(V_2 \otimes I_1) \times K \times (V_1 \otimes I_2)] \times [X]$, where $V_2$ is an M×M Fourier matrix for M sub-carriers, $\otimes$ is a Kronecker product, $I_1$ is an N×N identity matrix, K is a bit reordering matrix which is determined by the size of $V_2$, $V_1$ is an N×N Fourier matrix for the N antenna elements and $I_2$ is an M×M identity matrix.

29. The transceiver of claim 28 wherein the OFDM receiver comprises:
  (b1) a first stage FFT processor in communication with the antenna array, the first stage FFT processor being configured to perform at least one FFT function on the received signals and output the separate spatial beams;
  (b2) N serial-to-parallel (S/P) converters, each S/P converter being configured to receive a respective one of the separate spatial beams; and
  (b3) N second stage FFT processors in communication with respective ones of the plurality of S/P converters.

30. The transceiver of claim 29 wherein the OFDM receiver further comprises:
  (b4) a parallel-to-serial (P/S) converter in communication with each of the second stage FFT processors, wherein the P/S converter is configured to output a data stream based on beam signals processed by each of the second stage FFT processors.

31. The transceiver of claim 29 wherein the first stage FFT processor is a Butler matrix.

32. The transceiver of claim 28 wherein the antenna array is a Butler matrix array.

33. The transceiver of claim 28 wherein the antenna array is a circular antenna array which provides 360 degrees of simultaneous azmuthal coverage.

34. The transceiver of claim 28 wherein the antenna array is a vertical antenna array which provides elevational coverage.

35. The transceiver of claim 28 wherein the antenna array is a combination of (i) a circular antenna array which provides 360 degrees of simultaneous azmuthal coverage, and (ii) a vertical antenna array which provides elevational coverage.

36. A wireless transceiver comprising:
    (a) an antenna array having N antenna elements; and
    (b) a beam space processor in communication with the antenna array, the beam space processor being configured to perform fast Fourier transforms (FFTs) on signals received by the antenna array so as to output N beam carrier signals derived from the received signals, wherein beam signals "[X]" are transformed to a parallel data stream "[U]" by performing a fast Fourier transform (FFT) beam space operation on the beam signals "[X]" in accordance with the following equation: $[U]=[(V_2 \otimes I_1) \times K \times (V_1 \otimes I_2)] \times [X]$, where $V_2$ is an M×M Fourier matrix for M sub-carriers, $\otimes$ is a Kronecker product, $I_1$ is an N×N identity matrix, K is a bit reordering matrix which is determined by the size of $V_2$, $V_1$ is an N×N Fourier matrix for the N antenna elements and $I_2$ is an M×M identity matrix.

37. The transceiver of claim 36 wherein the beam space processor is configured to change an order of operations as necessary to perform at least one FFT function on the received signals and output the N beam carrier signals, and the transceiver further comprises a parallel-to-serial (P/S) converter in communication with the beam space processor, wherein the P/S converter is configured to serialize the N beam carrier signals to form a single output data stream.

38. The transceiver of claim 37 wherein the beam space processor uses an FFT to implement a Butler matrix in an efficient manner.

39. The transceiver of claim 36 wherein the antenna array is a circular antenna array which provides 360 degrees of simultaneous azmuthal coverage.

40. The transceiver of claim 36 wherein the antenna array is a vertical antenna array which provides elevational coverage.

41. The transceiver of claim 36 wherein the antenna array is a combination of (i) a circular antenna array which provides 360 degrees of simultaneous azmuthal coverage, and (ii) a vertical antenna array which provides elevational coverage.

42. A wireless communication apparatus for processing a plurality of beam signals "[X]" received from N antenna elements of an antenna array, the apparatus comprising:
    (a) means for transforming the beam signals "[X]" to a parallel data stream "[U]" by performing a fast Fourier transform (FFT) beam space operation an the beam signals "[X]" in accordance with the following equation: $[U]=[(V_2 \otimes I_1) \times K \times (V_1 \otimes I_2)] \times [X]$, where $V_2$ is an M×M Fourier matrix for M sub-carriers, $\otimes$ is a Kronecker product, $I_1$ is an N×N identity matrix, K is a bit reordering matrix which is determined by the size of $V_2$, $V_1$ is an N×N Fourier matrix for the N antenna elements and $I_2$ is an M×M identity matrix; and
    (b) means for converting the parallel data stream to a serial data stream.

43. An orthogonal frequency division multiplexing (OFDM) receiver for processing a plurality of beam signals "[X]" received from N antenna elements of an antenna array, the OFDM receiver comprising:
    (a) means for transforming the beam signals "[X]" to a parallel data stream "[U]" by performing a fast Fourier transform (FFT) beam space operation on the beam signals "[X]" in accordance with the following equation: $[U]=[(V_2 \otimes I_1) \times K \times (V_1 \otimes I_2)] \times [X]$, where $V_2$ is an M×M Fourier matrix for M sub-carriers, $\otimes$ is a Kronecker product, $I_1$ is an N×N identity matrix, K is a bit reordering matrix which is determined by the size of $V_2$, $V_1$ is an N×N Fourier matrix for the N antenna elements and $I_2$ is an M×M identity matrix; and
    (b) means for converting the parallel data stream to a serial data stream.

44. An integrated circuit (IC) for processing a plurality of beam signals "[X]" received from N antenna elements of an antenna array, the IC comprising:
    (a) means for transforming the beam signals "[X]" to a parallel data stream "[U]" by performing a fast Fourier transform (FFT) beam space operation on the beam signals "[X]" in accordance with the following equation: $[U]=[(V_2 \otimes I_1) \times K \times (V_1 \otimes I_2)] \times [X]$, where $V_2$ is an M×M Fourier matrix for M sub-carriers, $\otimes$ is a Kronecker product, $I_1$ is an N×N identity matrix, K is a bit reordering matrix which is determined by the size of $V_2$, $V_1$ is an N×N Fourier matrix for the N antenna elements and $I_2$ is an M×M identity matrix; and
    (b) means for converting the parallel data stream to a serial data stream.

45. A wireless transceiver for processing a plurality of beam signals "[X]" received from N antenna elements of an antenna array, the transceiver comprising:
    (a) means for transforming the beam signals "[X]" to a parallel data stream "[U]" by performing a fast Fourier transform (FFT) beam space operation in accordance with the following equation: $[U]=[(V_2 \otimes I_1) \times K \times (V_1 \otimes I_2)] \times [X]$, where $V_2$ is an M×M Fourier matrix for M sub-carriers, $\otimes$ is a Kronecker product, $I_1$ is an N×N identity matrix, K is a bit reordering matrix which is determined by the size of $V_2$, $V_1$ is an N×N Fourier matrix for the N antenna elements and $I_2$ is an M×M identity matrix; and
    (b) means for converting the parallel data stream to a serial data stream.

46. A base station comprising:
    (a) an antenna array having N antenna elements; and
    (b) an orthogonal frequency division multiplexing (OFDM) receiver in communication with the antenna array, the OFDM receiver being configured to perform fast Fourier transforms (FFTs) on signals received by the antenna array so as to output N beam carrier signals derived from the received signals, wherein beam signals "[X]" are transformed to a parallel data stream "[U]" by performing a fast Fourier transform (FFT) beam space operation on the beam signals "[X]" in accordance with the following equation: $[U]=[(V_2 \otimes I_1) \times K \times (V_1 \otimes I_2)] \times [X]$, where $V_2$ is an M×M Fourier matrix for M sub-carriers, $\otimes$ is a Kronecker product, $I_1$ is an N×N identity matrix, K is a bit reordering matrix which is determined by the size of $V_2$, $V_1$ is an N×N Fourier matrix for the N antenna elements and $I_2$ is an M×M identity matrix.

47. The base station of claim 46 wherein the OFDM receiver comprises:
(b1) a beam space processor in communication with the antenna array, the beam space processor being configured to change an order of operations as necessary to perform at least one FFT function on the received signals and output the N beam carrier signals; and
(b2) a parallel-to-serial (P/S) converter in communication with the beam space processor, wherein the P/S converter is configured to serialize the N beam carrier signals to form a single output data stream.

48. The base station of claim 47 wherein the beam space processor uses an FFT to implement a Butler matrix in an efficient manner.

49. The base station of claim 46 wherein the antenna array is a circular antenna array which provides 360 degrees of simultaneous azmuthal coverage.

50. The base station of claim 46 wherein the antenna array is a vertical antenna array which provides elevational coverage.

51. The base station of claim 46 wherein the antenna array is a combination of (i) a circular antenna array which provides 360 degrees of simultaneous azmuthal coverage, and (ii) a vertical antenna array which provides elevational coverage.

52. A base station for processing a plurality of beam signals "[X]" received from N antenna elements of an antenna array, the base station comprising:
(a) means for transforming the beam signals "[X]" to a parallel data stream "[U]" by performing a fast Fourier transform (FFT) beam space operation on the beam signals "[X]" in accordance with the following equation: $[U]=[(V_2 \otimes I_1) \times K \times (V_1 \otimes I_2)] \times [X]$, where $V_2$ is an M×M Fourier matrix for M sub-carriers, $\otimes$ is a Kronecker product, $I_1$ is an N×N identity matrix, K is a bit reordering matrix which is determined by the size of $V_2$, $V_1$ is an N×N Fourier matrix for the N antenna elements and $I_2$ is an M×M identity matrix; and
(b) means for converting the parallel data stream to a serial data stream.

* * * * *

UNITED STATES PATENT AND TRADEMARK OFFICE
CERTIFICATE OF CORRECTION

PATENT NO. : 7,164,740 B2  Page 1 of 1
APPLICATION NO. : 10/991557
DATED : January 16, 2007
INVENTOR(S) : Olesen et al.

It is certified that error appears in the above-identified patent and that said Letters Patent is hereby corrected as shown below:

At column 3, line 47, in equation 2, remove " $v\dfrac{H}{m} = \dfrac{1}{N} \dfrac{\sin\left(\dfrac{N}{2}\left(\vartheta - m^{2\pi/N}\right)\right)}{\sin\left(\dfrac{1}{2}\left(\vartheta - m^{2\pi/N}\right)\right)}$ " and insert -- $v\dfrac{H}{m} = \dfrac{1}{N} \dfrac{\sin\left(\dfrac{N}{2}\left(\vartheta - m^{\frac{2\pi}{N}}\right)\right)}{\sin\left(\dfrac{1}{2}\left(\vartheta - m^{\frac{2\pi}{N}}\right)\right)}$ --.

At column 3, line 53, after the word "where", delete "θ" and insert therefor -- $\vartheta$ --.

At column 4, line 40, after the words "convert each", insert --of--.

At claim 27, column 8, line 29, after the word "product,", delete "I₂" and insert therefor --I₁--.

At claim 42, column 9, line 65, before the words "where V₂", delete "[U]=[(V₂/I₁)xKx(V₁⊗I₂)]x[X]," and insert therefor--[U]=[(V₂⊗I₁)xKx(V₁⊗I₂)]x[X],--.

Signed and Sealed this

Nineteenth Day of June, 2007

JON W. DUDAS
*Director of the United States Patent and Trademark Office*